United States Patent
Backman et al.

(10) Patent No.: US 10,608,987 B2
(45) Date of Patent: Mar. 31, 2020

(54) SYSTEM AND METHOD FOR PROVIDING IP ADDRESS TRANSLATION SERVICES

(71) Applicant: Telefonaktiebolaget LM Ericsson (publ), Stockholm (SE)

(72) Inventors: Jan Backman, Kärna (SE); Fredrik Garneij, Göteborg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 140 days.

(21) Appl. No.: 15/310,521

(22) PCT Filed: May 13, 2015

(86) PCT No.: PCT/EP2015/060558
§ 371 (c)(1),
(2) Date: Nov. 11, 2016

(87) PCT Pub. No.: WO2015/173287
PCT Pub. Date: Nov. 19, 2015

(65) Prior Publication Data
US 2017/0078243 A1 Mar. 16, 2017

Related U.S. Application Data

(60) Provisional application No. 61/992,565, filed on May 13, 2014.

(51) Int. Cl.
*H04L 29/12* (2006.01)
*H04W 8/26* (2009.01)
(Continued)

(52) U.S. Cl.
CPC ............ *H04L 61/251* (2013.01); *H04W 8/26* (2013.01); *H04L 45/741* (2013.01);
(Continued)

(58) Field of Classification Search
CPC .................................. H04L 61/00; H04W 8/00
See application file for complete search history.

(56) References Cited

U.S. PATENT DOCUMENTS 7,443,880 B2  10/2008 Wetterwald et al.
8,451,845 B2   5/2013 Boucadair et al.
(Continued)

FOREIGN PATENT DOCUMENTS

CN     1965515 A   5/2007
CN   101828362 A   9/2010
(Continued)

OTHER PUBLICATIONS

IPV6 Addressing of IPv4/IPV6 Translators; RFC 6052, TXT, Internet Engineering Task Force, IETF, pp. 1-18 (Year: 2010).*
IPV6 Addressing of IPv4/IPV6 Translators; RFC 6052, TXT, Internet Engineering Task Force, IETF, pp. 1-18 (Year: 2010) (Year: 2010).*

(Continued)

*Primary Examiner* — Andrew Lai
*Assistant Examiner* — Sumitra Ganguly
(74) *Attorney, Agent, or Firm* — Rothwell, Figg, Ernst & Manbeck, P.C.

(57) ABSTRACT

A method for providing IP address translation services includes receiving, at a network node, a data packet from a wireless device. The data packet includes a target IP address associated with a destination device. The network node translates the target IP address into a synthetic IP address that contains the target IP address. A modified data packet is generated by replacing the target IP address in the data packet with the synthetic IP address. The network node transmits the modified data packet to the destination device.

20 Claims, 9 Drawing Sheets

(51) Int. Cl.
*H04L 12/749* (2013.01)
*H04W 88/16* (2009.01)

(52) U.S. Cl.
CPC ........ *H04L 61/2007* (2013.01); *H04L 61/305* (2013.01); *H04W 88/16* (2013.01)

(56) References Cited

U.S. PATENT DOCUMENTS

| | | | |
|---|---|---|---|
| 8,797,947 B2 | 8/2014 | Aalto et al. | |
| 10,079,917 B2 | 9/2018 | Savolainen et al. | |
| 2004/0179536 A1* | 9/2004 | Thubert | H04L 29/06 370/395.52 |
| 2005/0286553 A1* | 12/2005 | Wetterwald | H04L 29/12009 370/466 |
| 2011/0110375 A1* | 5/2011 | Boucadair | H04L 29/12358 370/393 |
| 2011/0205959 A1* | 8/2011 | Aalto | H04L 45/00 370/328 |
| 2011/0242975 A1* | 10/2011 | Zhao | H04L 29/12216 370/230 |
| 2013/0201999 A1* | 8/2013 | Savolainen | H04L 61/1511 370/467 |

FOREIGN PATENT DOCUMENTS

| | | |
|---|---|---|
| CN | 102132544 A | 7/2011 |
| CN | 102859972 A | 1/2013 |

OTHER PUBLICATIONS

International Search Report and Written Opinion dated Aug. 12, 2015 in International application No. PCT/EP2015/060558, 9 pages.
Matsushima Softbank Telecom et al., "Stateless user-plane architecture for virtualized EPC (vEPC); draft-matsushima-stateless-uplane-vepc-02. txt", Stateless User-Plane Architecture for Virtualized EPC (VEPC); Draft-Matsushima-Stateless-Uplane-VEPC-02. TXT, Internet Engineering Task Force, IETF; Standardworkingdraft, Internet Society (ISOC) 4, Rue Des Falaises CH-1205 Geneva, Switzerland, Feb. 14, 2014 (Feb. 14, 2014), pp. 1-20, XP015097113.
Mawatari Japan Internet Exchange M Kawashima NEC Accesstechinica et al., "464XLAT: Combination of Stateful and Stateless Translation; rfc6877.txt", 464XLAT: Combination of Stateful and Stateless Translation; RFC6877.TXT, Internet Engineering Task Force, IETF; Standard, Internet Society (ISOC) 4, Rue Des Falaises CH-1205 Geneva, Switzerland, Apr. 3, 2013 (Apr. 3, 2013), pp. 1-4, XP015090335.
Bao Cernet Center/Tsinghua University et al.,"IPv6 Addressing of IPv4/IPv6 Translators; rfc6052.txt", IPV6 Addressing of IPV4/IPV6 Translators; RFC6052.TXT, Internet Engineering Task Force, IETF; Standard, Internet Society (ISOC) 4, Rue Des Falaises CH-1205 Geneva, Switzerland, Oct. 29, 2010 (Oct. 29, 2010), pp. 1-18, XP015073061.
Chinese Office Action with English Notification and Summary issued in corresponding Chinese Application No. 2015800243754, dated Feb. 19, 2019, 8 pages.
English Translation of Chinese Search Report issued in corresponding Chinese Application No. 2015800243754, 2 pages.

* cited by examiner

SYSTEM AND METHOD FOR PROVIDING IP ADDRESS TRANSLATION SERVICES

CROSS-REFERENCE TO RELATED APPLICATION(S)

This application is a 35 U.S.C. § 371 National Phase Entry Application from PCT/EP2015/060558, filed May 13, 2015, and designating the United States, which claims priority to U.S. Provisional Application No. 61/992,565, filed on May 13, 2014. The contents of both applications are incorporated by reference.

TECHNICAL FIELD

Particular embodiments relate generally to a network system and more particularly to a system and method for providing IP address translation services.

BACKGROUND

With the increasing expansion of the Internet, legacy network IP addresses, such as IPv4 addresses which may be composed of a mere 32 bits, are becoming more scarce. To address this and other issues, an IPv6 protocol employing IP addresses of 128 bits has been proposed. In addition to thoroughly solving the problem of scarcity of the IPv4 addresses, IPv6 protocol provides significant improvements on addresses capacity, security, network management, and mobility and quality of service among other things.

Before a new protocol becomes the mainstream protocol and is uniformly used by mobile networks, network components must be able to operate according to both the protocols. For example, even after a new protocol such as IPv6 is uniformly adopted, legacy mobile devices that operate using IPv4 may be used. As another example, it is generally the case that IPv4 applications are not able to run in an IPv6 environment and IPv6 applications are not run in an IPv4 environment. Thus, even where most applications may support both IPv4 and IPv6 protocol, there may still be some applications and services that only support IPv4. As a result, IPv6 resources may be underutilized. As still another example, due to an imbalance of address allocation, some countries or regions may have IPv4 address space available for allocation long after the new IPv6 protocol is implemented.

Because IPv4 and IPv6 networks will likely coexist for a long time, solutions have been created to enable IPv4 and IPv6 networks to coexist. These IPv4 to IPv6 transition technologies may enable existing IPv4 applications to run over the IPv6 network. Thus, while the network may be updated to operate according to the new IPv6 protocol, the network may allow continued use of existing IPv4 application resources.

Existing IPv4 to IPv6 transition technologies for addressing the above problems attempt to get network operators to switch from IPv4 to IPv6. For example, in the packet domain, one example solution is an IPv4 to IPv6 Dual Stack Transition Mechanism (Dual Stack) that connects the dual stack hosts in the pure IPv6 network to the existing IPv4 hosts or applications. The purpose of Dual Stack is to provide both IPv4 and IPv6 connectivity to a network node or wireless device. Specifically, each terminal may receive both an IPv4 address and an IPv6 address. The terminal may use IPv6 when IPv6 is supported but fallback to using IPv4 when IPv6 is not supported. Additionally, Dual Stack may also add a gateway between the networks of different network protocols to achieve transmitting IPv4 traffic over the pure IPv6 network by using an IPv4 over IPv6 tunnel.

While Dual Stack provides some benefits, this IPv4 to IPv6 transition technology is not without disadvantages. For example, Dual Stack requires that there is both an IPv4 and IPv6 infrastructure at the Gi/SGi interface. As a result, the network operator is still required to manage IPv4 addresses as well as introduce support for IPv6 in the network. This increases operator costs since the operators must support and mange double IP addresses for all wireless devices in the network. As another example, large network operators continue to face a risk of exhaustion of private IPv4 address space. As still another disadvantage, Dual Stack technology requires all transparent value added services (e.g. service charging, traffic/service policies, parental control, firewalling etc.) on the Gi/SGi network to support both IPv4 as well as IPv6 if the value added services are to be used for both protocols.

A second technique for IPv4 to IPv6 transition in the packet core domain may include providing only an IPv6 address to each terminal. Using an address translation mechanism, all domain name service (DNS) lookup of IPv4 services are handled through a server, such as a DNS64, that translates the address of the IPv4 packet into a "synthetic" IPv6 address. The synthetic IPv6 address may contain the target IPv4 address. Specifically, translation from IPv6 to IPv4 may be done in an external NAT64 that is addressed by the IPv6 address returned by the DNS64. Alternatively, some applications may use IPv4 addresses natively. For wireless devices that support 464XLAT technology through a CLAT mechanism (such as Android 4.3 and later and some Nokia terminals), the wireless device translates the IPv4 traffic into IPv6 (stateless XLAT) towards the NAT64. Thus, an IPv6 only solution includes either a risk that IPv4 services will not work (e.g. applications that do not support IPv6 at all such as Skype and Spotify) or requires support in the wireless for the 464XLAT technology (CLAT mechanism). If 464XLAT is not supported, wireless device cannot be transitioned to IPv6. However, even where 464XLAT is supported, it may only be supported for a subset of the wireless devices in the network.

SUMMARY

In a particular example implementation, a method for providing IP address translation services includes receiving, at a network node, a data packet from a wireless device. The data packet includes a target IP address associated with a destination device. The network node translates the target IP address into a synthetic IP address that contains the target IP address. A modified data packet is generated by replacing the target IP address in the data packet with the synthetic IP address. The network node transmits the modified data packet to the destination device.

In another example implementation, a network node for providing IP address translation services includes a memory storing instructions and one or more processors in communication with the memory. The one or more processors are operable to execute the instructions to cause the one or more processors to receive a data packet from a wireless device. The data packet may include a target IP address associated with a destination device. The target IP address may be translated into a synthetic IP address that contains the target IP address. A modified data packet may be generated by replacing the target IP address in the data packet with the synthetic IP address. The modified data packet may be transmitted to the destination device.

Some embodiments of the disclosure may provide one or more technical advantages. For example, certain embodiments may place the CLAT-part of the 464XLAT technology in the gateway support node instead of the wireless device. As a result, wireless devices that do not include support for the 464XLAT technology may get support for 464XLAT processing through the use of a CLAT service in the GGSN/PGW or other gateway support node 202. As a result, the entire Gi/SGi network can become IPv6 only for applications that have this functionality activated. Still another technical advantage may be that the operator is not required to in any way manage IPv4 addresses.

Another technical advantage may be that the amount of IPv4 traffic of a dual stack implementation flowing through the NAT44/NAT64 is not more than with a pure non-NATed IPv4 setup. However, if Dual Stack is deployed, IPv6 may increasingly offload IPv4 as more services are also offered over IPv6. Furthermore, as NAT capacity needs decreases, the need for NAT expansion will be reduced and may be eliminated.

Some embodiments may benefit from some, none, or all of these advantages. Other technical advantages may be readily ascertained by one of ordinary skill in the art.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Particular embodiments are described in FIGS. 1-6 of the drawings, like numerals being used for like and corresponding parts of the various drawings.

Figure 1:
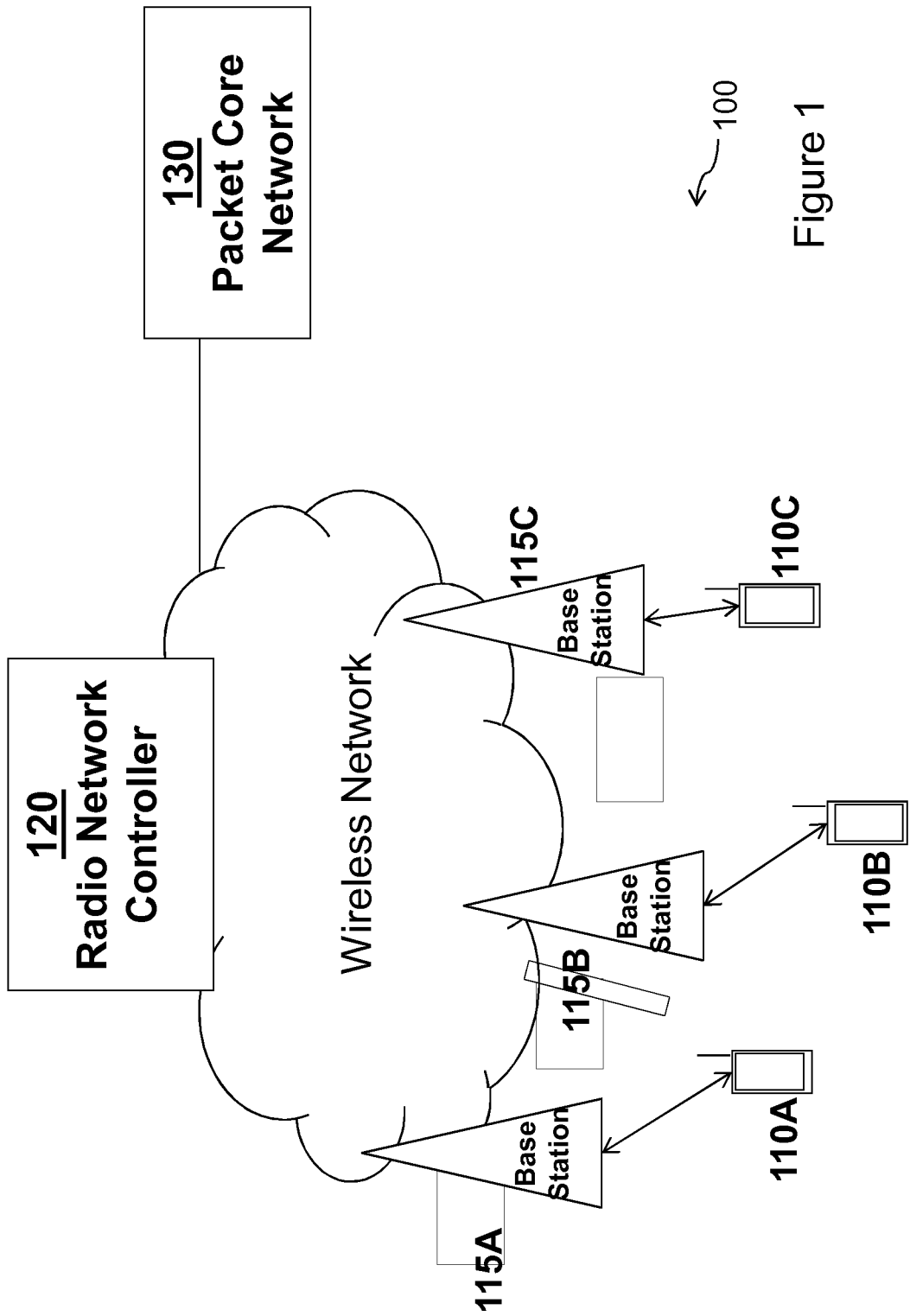
FIG. 1 is a block diagram illustrating an exemplary network, according to a particular embodiment.

A radio network controller may facilitate a communication session for a wireless device seeking to access services provided by a packet core network. FIG. 1 is a block diagram illustrating an exemplary radio network 100 that includes one or more wireless devices 110A-C, radio network nodes 115A-C, radio network controller 120, and packet core network node 130. Wireless devices 110A-C may communicate with radio network nodes 115A-C over a wireless interface. For example, wireless device 110A may transmit wireless signals to radio network node 115A and/or receive wireless signals from radio network node 115A. The wireless signals may contain voice traffic, data traffic, control signals, and/or any other suitable information.

Radio network nodes 115A-C may interface with radio network controller 120. The radio network nodes 115A-C and the radio network controller 120 are comprised in a radio access network, RAN. Radio network controller 120 may control radio network node 115A-C and may provide certain radio resource management functions, mobility management functions, and/or other suitable functions. Radio network controller 120 may interface with packet core network node 130. In certain embodiments, radio network controller 120 may interface with packet core network node 130 via an interconnecting network. The interconnecting network may refer to any interconnecting system capable of transmitting audio, video, signals, data, messages, or any combination of the preceding. The interconnecting network may include all or a portion of a public switched telephone network, PSTN; a public or private data network; a local area network, LAN; a metropolitan area network, MAN; a wide area network, WAN; a local, regional, or global communication or computer network such as the Internet; a wireline or wireless network; an enterprise intranet; or any other suitable communication link, including combinations thereof.

In some radio access technologies, RATs, such as in LTE networks, the functions of the radio network controller 120 are comprised in the radio network nodes 115A-C. In some embodiments, packet core network node 130 may manage the establishment of communication sessions and various other functionality for wireless devices 110A-C. For example, wireless devices 110A-C, radio network nodes 115A-C, and packet core network node 130 may use any suitable radio access technology, such as long term evolution, LTE; LTE-Advanced; Universal Mode Telecommunications System, UMTS; High Speed Packet Access, HSPA; Global System for Mobile Communications, GSM; code division multiple access 2000, CDMA2000; Worldwide Interoperability for Microwave Access, WiMax; WiFi; another suitable radio access technology; or any suitable combination of one or more of these or other radio access technologies. In particular embodiments, a wireless device 110A-C may exchange certain signals with packet core network node 130 using the non-access stratum layer. In non-access stratum signaling, signals between wireless device 110A-C and packet core network node 130 may be transparently passed through the radio access network.

As described herein, embodiments of network 100 may include one or more wireless devices 110A-C, and one or more different types of network nodes capable of communicating (directly or indirectly) with wireless devices 110A-C. Examples of the network nodes include network nodes 115A-C, radio network controller 120, and packet core network node 130. However, network 100 may include any additional elements suitable to support communication between wireless devices 110A-C or between a wireless device 110A-C and another communication device (such as a landline telephone). Each wireless device 110A-C, radio network node 115A-C, radio network controller 120, and packet core network node 130 may include any suitable combination of hardware and/or software. Examples of particular embodiments of radio network nodes 115A-B, network nodes (such as radio network controller 120 and packet core network 130), and wireless device 110A-C are described with respect to FIGS. 6, 7, and 8, respectively.

Figure 2:
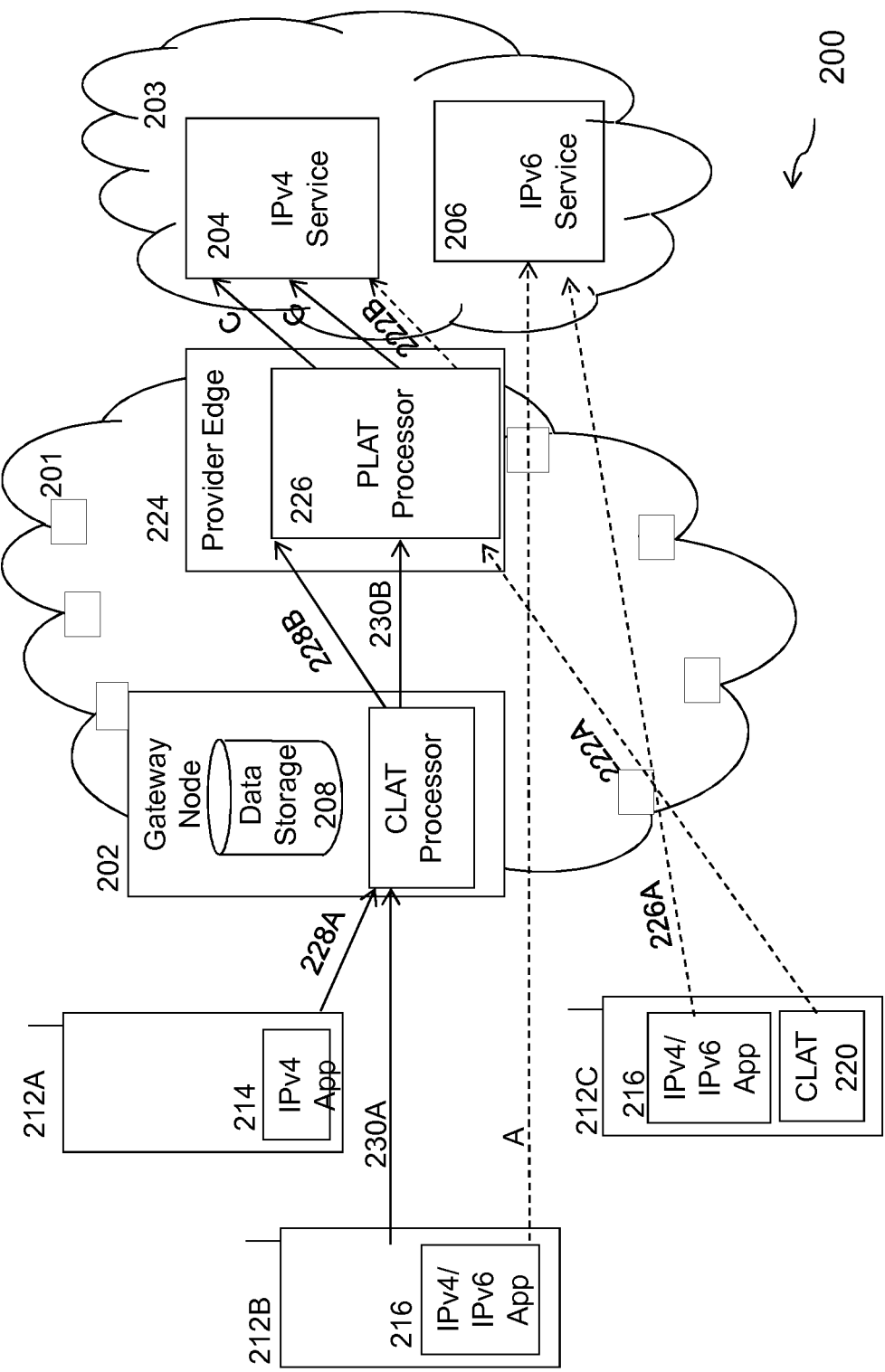
FIG. 2 is a block illustrating a network system for providing network side translation services for accessing IPv4 and IPv6 services, according to a particular embodiment.

In certain embodiments, a packet core network node may comprise a supporting gateway node that provides wireless devices with network access to various applications and services. FIG. 2 illustrates a block diagram of a network system 200 that includes a supporting gateway node 202 that provides network side translation services for accessing IPv4 and IPv6 services 204 and 206 offered via internet 203. As will be described in more detail below, supporting gateway node 202 may include hardware and software for performing address translation services such that requests received from wireless devices operating according to a variety of different protocols may traverse IPv6 network 201.

As depicted, network system 200 includes wireless devices 212A-C having different capabilities and operating according to different IP protocols. For example, in a particular embodiment, wireless device 212A includes a legacy device without IPv6 capability. Specifically, wireless device 212A may include IPv4 app 214 that is used for accessing IPv4 service 204. By contrast, wireless devices 212B and 212C each include IPv4 and IPv6 apps 216 for accessing IPv4 service 204 and IPv6 service 206, respectively. As such, wireless devices 212B and 212C may be called dual stack devices. However, each request for service from wireless devices 212B and 212C must use an IPv6 address that is suitable for traversal through IPv6 network 201, regardless of the protocol associated with wireless device 212A-B or the app/services requested. Accordingly, any request for IPv4 service 204 must be translated into an IPv6 request before the request can be transmitted across IPv6 network 201.

According to some embodiments, a wireless device such as wireless device 212C may include CLAT 220 for performing address translation. CLAT 220 is the client side portion of the 464XLAT technology that provides stateless address translation for the deployment of IPv4 services in an IPv6 network 201. More specifically, CLAT 220 may include daemon for the local performance of IP translation with regard to request 222A for IPv4 service 204. For example, when wireless device 212C seeks access to IPv4 service 204, CLAT 220 may translate the target IPv4 address associated with IPv4 service 204 into a synthetic IPv6 address. Wireless device 212C may then transmit request 222A to provider edge device 224 via IPv6 network 201. According to certain embodiments, provider edge device 224 may include PLAT 226 for translating the synthetic IPv6 address included in request 222A into the target IPv4 address suitable for accessing IPv4 service 204. Provider edge device 224 may replace the synthetic IPv6 address with the target IPv4 address and transmit a modified request 222B to IPv4 service 204.

In certain embodiments, wireless device 212C may additionally or alternatively seek access to IPv6 service 206. For example, wireless device 212C may generate a request 226A for IPv6 service 206. Request 226A may have a target IPv6 address. As such, request 226A for IPv6 service 206 may be transmitted directly to IPv6 service 206 via IPv6 network 201 without any translation by CLAT 220 or another component.

However, not all wireless devices seeking access to IPv4 and IPv6 services may be equipped with CLAT technology. As such, some legacy wireless devices may not be equipped to perform for local translation of an IPv4 address to an IPv6 address as is needed for traversal through network 201. In the depicted system of FIG. 2, for example, wireless devices 212A and 212B do not include CLAT technology and, thus, are not able to perform local IP address translation. To enable wireless devices 212A and 212B to access desired IPv4 services 204, the CLAT portion of the 464XLAT technology may be placed in the supporting gateway node 202. Thus, in certain embodiments, CLAT address translation may be provided on the network side for enabling wireless devices 212A and 212B that do not include CLAT technology to access IPv4 service 204 via IPv6 network 201. In this manner, the entire Gi/SGi network can become IPv6 for wireless devices 212A-B communicating via gateway support node 202 having the CLAT functionality.

Figure 3:
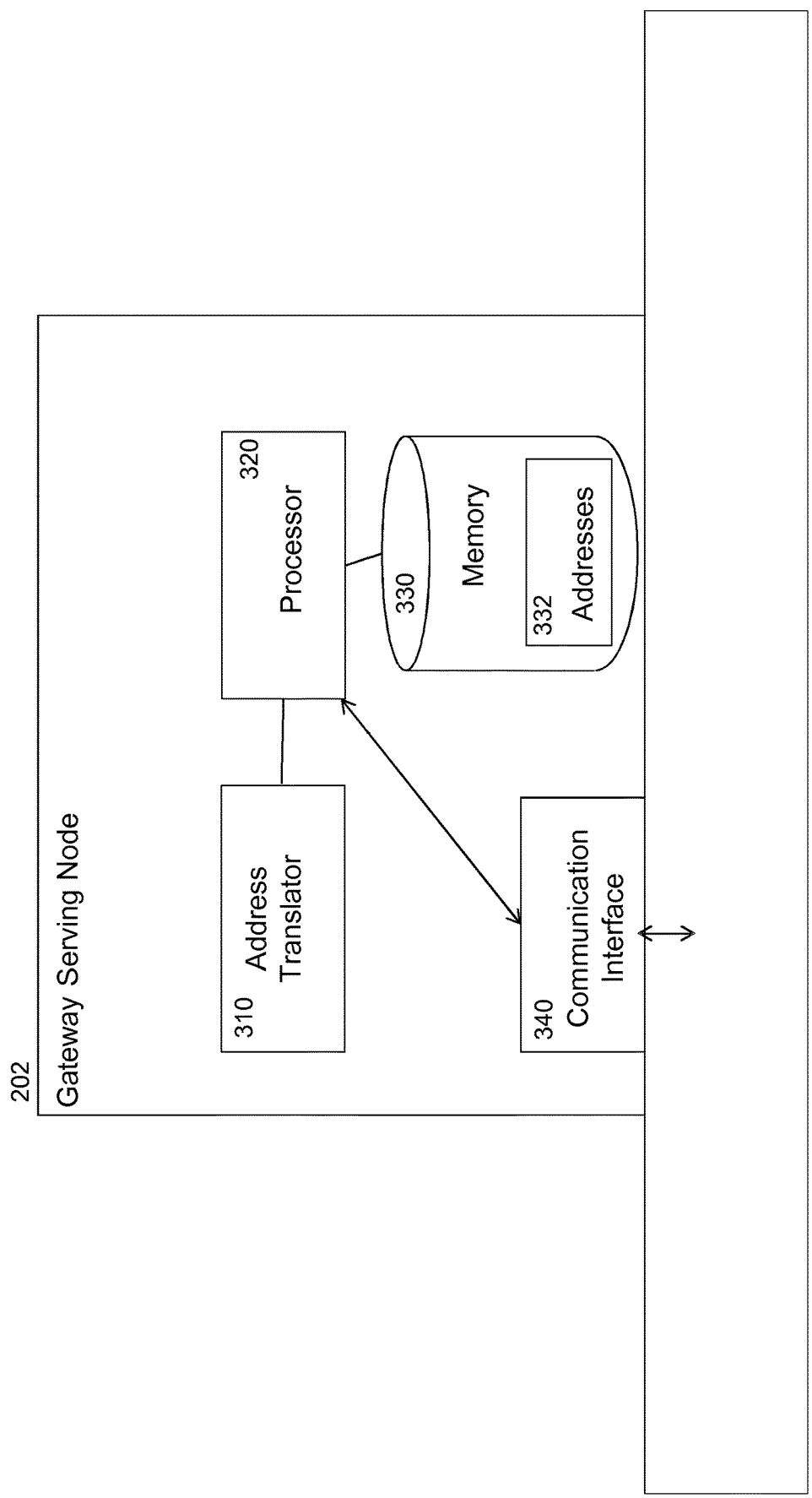
FIG. 3 is a block diagram illustrating an exemplary gateway support node, according to a particular embodiment.

FIG. 3 is a block diagram illustrating a gateway support node 202 that may include components for storing logic and/or instructions for implementing CLAT processing, according to certain embodiments. Examples of gateway support node 202 may include a mobile switching center (MSC), a serving GPRS support node (SGSN), a mobility management entity (MME), a radio network controller (RNC), a base station controller (BSC), and so on. Gateway support node 202 includes address translator 310, processor 320, address repository 330, and communication interface 340 that cooperate to perform address translation as described herein.

Processor 320 may include any suitable combination of hardware and software implemented in one or more executable modules for the manipulation of data to perform some or all of the functionality described herein as being provided by gateway support node 202. In some embodiments, processor 320 may include, for example, one or more computers, one or more central processing units (CPUs), one or more microprocessors, one or more applications, and/or other logic.

Address repository 330 is generally operable to store instructions, such as a computer program, software, an application including one or more of logic, rules, algorithms, code, tables, etc. and/or other instructions capable of being executed by a processor. Examples of address repository 330 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information. In certain embodiments, address repository 330 may store the instructions executed by processor 320 to enable translation of a target IPv4 address into a synthetic IPv6 address.

In operation, communication interface 340 communicates signals to a suitable node, such as a gateway, switch, router, Internet, Public Switched Telephone Network (PSTN), and/or wireless devices 212A-C.

In some embodiments, communication interface 340 is communicatively coupled to processor 320 and may refer to any suitable device operable to receive input for gateway support node 202, send output from the gateway support node 202, perform suitable processing of the input or output or both, communicate to other devices, or any combination of the preceding. Communications interface 340 may include appropriate hardware (e.g., port, modem, network interface card, etc.) and software, including protocol conversion and data processing capabilities, to communicate through a network. In certain embodiments, for example, communication interface 340 may communicate signals to a suitable node, such as a gateway, switch, router, Internet, Public Switched Telephone Network (PSTN), and/or wireless devices 212A-C.

Other embodiments of gateway support node 202 may include additional components beyond those shown in FIG.

3 that may be responsible for providing certain aspects of the network node's functionality, including any of the functionality described herein and/or any additional functionality (including any functionality necessary to support the solution described herein).

Figure 4:
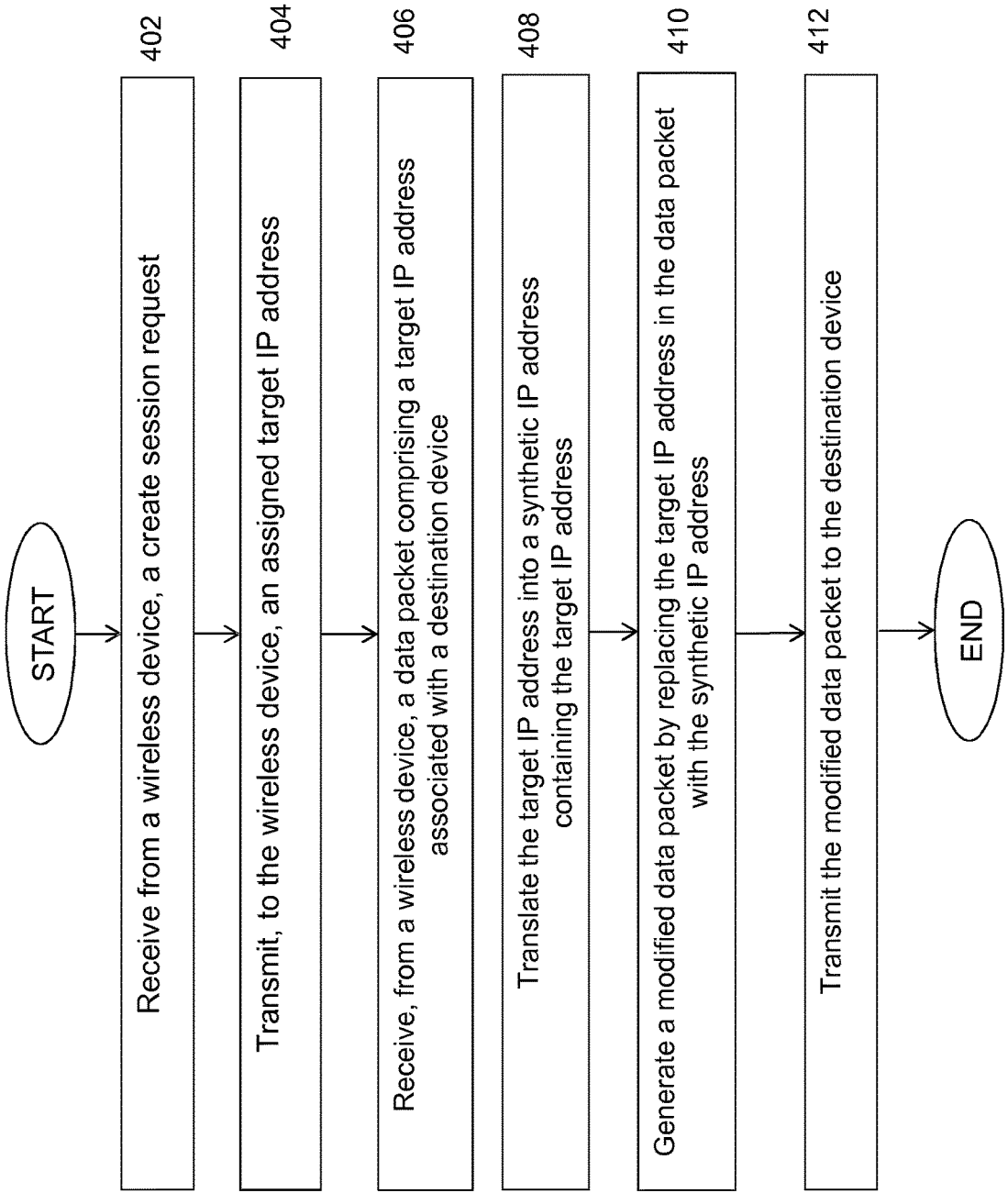
FIG. 4 is as flow chart illustrating an exemplary method of performing network address translation at a gateway support node, according to a particular embodiment.

An exemplary method for performing network address translation by gateway support node 202 is illustrated in FIG. 4. The method may begin at step 402 when gateway support node receives a create session request from a wireless device 212A. Gateway support node may then assign an IPv4 address to the requesting wireless device 212A. The assigned IP address may be transmitted to wireless device 212A at step 404.

In a particular embodiment, gateway support node 202 may maintain a repository of unique IPv4 addresses. Accordingly, gateway support node 202 may identify a particular one of the available unique IPv4 address and assign the unique IPv4 address to wireless device 212A. A very simple and efficient solution that provides for debugging may include using the last 24 bits in the IPv6 prefix allocated to wireless device to also be used as the last 24 bits in an IPv4 address from the 10.0.0.0/8 address range. While address assignment approach may not guarantee that the IPv4 address is unique, it may simplify the correlation to the IPv6 prefix that normally would be public address space and unique.

In other embodiments, gateway support node 202 may use one "dummy" IPv4 address for all wireless devices. A non-unique IPv4 address is not routable but since a unique IPv6 prefix is allocated to each wireless device, the translated IPv6 address may be unique for each wireless device. As such the translated IPv6 address may be successfully routed through the IPv6 network.

At step 406, Gateway support node 202 receives a data packet that includes a target IP address associated with a destination device. For example, the data packet may include request 228A for IPv4 service 204. Thus, the data packet may include a target IPv4 address of a destination device hosting IPv4 service 204.

At step 408, gateway support node 202 may translate the target IP address of request 228A into a synthetic IP address. In a particular embodiment, the synthetic IP address may comprise an IPv6 address that includes the target IP address. A modified data packet is generated by gateway support node 202 at step 410. Specifically, gateway support node 202 may replace the target IPv4 address in request 228A with the synthetic IPv6 address to generate modified data packet 228B. Various techniques for generating the synthetic address will be described in more detail below with regard to FIG. 5. However, in a particular embodiment, CLAT processor 210 may use a prefix associated with PLAT processor 226 of provider edge device 224 as the synthetic destination address. In a particular embodiment, gateway support node 202 may not announce the IPv4 addresses used in the network 201 to the surrounding devices and nodes. Thus, only the IPv6 addresses may be visible in the surrounding network environment.

At step 412, gateway support node 202 transmits the modified data packet toward the destination device hosting IPv4 Service 204. In a particular embodiment, gateway support node 202 may not announce the IPv4 addresses used in IPv6 network 201 to the surrounding devices and nodes. Thus, only the IPv6 addresses may be visible in the surrounding network environment.

Returning to FIG. 2, provider edge device 224 may receive the modified request 228B from gateway support node 202. In a particular embodiment, provider edge device 224 includes a standard NAT64 box that translates IPv6 requests communicated via IPv6 network 201 into IPv4 addresses suitable for accessing IPv4 service 204. Specifically, PLAT processor 226 may perform a PLAT operation to extract the target IPv4 address from the synthetic IPv6 address of the data packet received from gateway support node 202. Provider edge device 224 may replace the synthetic IPv6 address with the target IPv4 address and forward a modified request 228C to the destination device that is hosting IPv4 service 204. In certain embodiments, PLAT processor 226 of provider edge device 224 may create a NAT-mapping between the IPv6 and the IPv4 address to allow protocol-diverse devices to communicate. One such provider edge device that supports PLAT functionality is the Ericsson Multiservice Proxy.

In response to the received request for IPv4 service 204, the destination device that is hosting IPv4 service 204 may send a downlink transmission to the requesting wireless device 212A. The data may be transmitted in a manner similar to that described for the uplink transmission described above except in reverse. For example, in a particular embodiment, the device offering IPv4 service 204 may identify the IPv4 address associated with PLAT processor 226 as the source address of modified request 228C. In response to modified request 228C. Data relating to the IPv4 service 204 may be transmitted to PLAT processor 226 using the IPv4 address. PLAT processor 226 may then translate the IPv4 address into a synthetic IPv6 address before transmitting the data to CLAT processor 210 via IPv6 network 201. Gateway support node 202 may translate the synthetic IPv6 address to the IPv4 address before transmitting the data to wireless device 212A.

In the above described example scenario, wireless device 212A is an IPv4-type terminal device. As such, all traffic from wireless device 212A is IPv4 traffic and must be undergo CLAT processing by gateway support node 202. However, a wireless device that is a dual stack Ipv4v6 device, such as wireless device 212B depicted in FIG. 2 may transmit both IPv4 traffic and IPv6 traffic. A request 232A from wireless device 212B for IPv6 service 206 may be transmitted over network 201 without any translation. Conversely, a request 230A for IPv4 service 204 would require CLAT processing by gateway support node 202 before the request could be transmitted over the IPv6 network 201. Request 230A may be handled similarly to request 228A from wireless device 212A described above.

Figure 5:
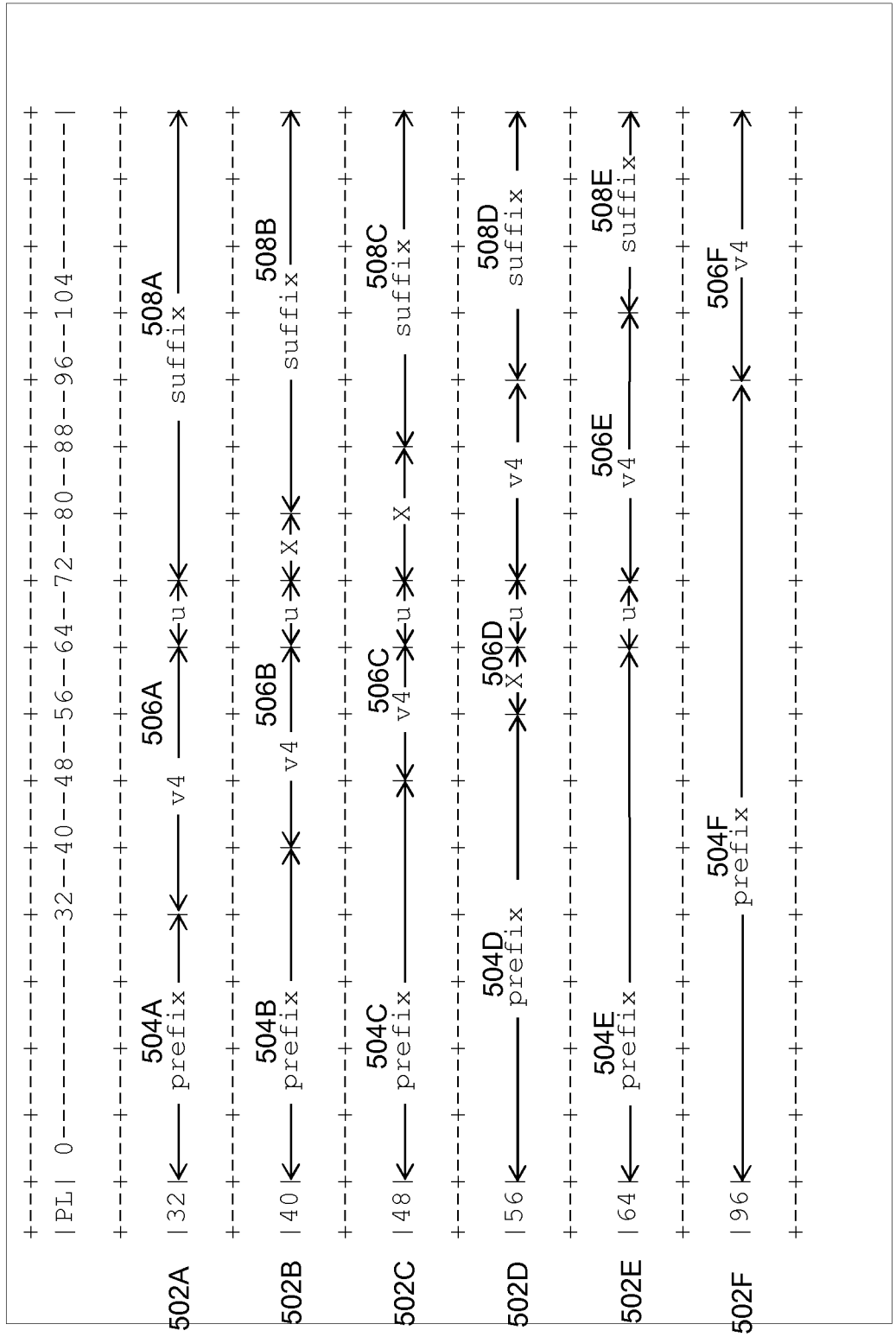
FIG. 5 is a diagram illustrating alternative encoding schemes for generating a synthetic IPv6 address using a simplified NAT64 implementation, according to a particular embodiment.

FIG. 5 is a diagram illustrating a simplified NAT64 implementation 500 for generating a synthetic IPv6 address according to various alternative encoding schemes 502A-502F, according to certain embodiments.

As described above, gateway support node 202 may receive an IPv4 packet addressed to a destination towards the Ipv6 domain, in certain embodiments. Gateway support node 202 may translate the IPv4 address of the request into an IPv6 address. The original IPv4 destination address on the packet may be removed and replaced with an IPv6 destination address. In a particular embodiment, the transport checksum may be updated as needed.

In certain embodiments, the target IPv4 destination address may be replaced with a synthetic IPv6 address that includes a unique IPv6 prefix and the target IPv4 address. In certain embodiments, the suffix part may be used to carry information about the NAT state, e.g. IPv4 source address used towards the public address space and also the source port used.

In a particular embodiment, the synthetic IPv6 address may be a 128-bit address that is composed in accordance with RFC 6145. The 128-bit IPv6 address may include a first portion comprising a prefix portion 504A-F, a second portion comprising middle portion 506A-F, and last portion comprising a suffix portion 508A-F. In certain embodiments, the synthetic IPv6 address may be composed by concatenating the prefix portion 504A-F, the 32 bits of the IPv4 address, and the suffix portion 508A-F, if needed to obtain the 128-bit address. If the length of prefix portion 504A-F is less than 96 bits, a null octet "u" may be inserted at the appropriate position. For example, the null octet may be inserted into bits 64 to 71, in a particular embodiment.

According to encoding schemes 502A-F, the amount of bits allocated to each prefix 504A-F and suffix 508A-F may be varied, in certain embodiments. Specifically, prefix 504A-F may vary from 32 bits, as in encoding scheme 502A, to 96 bits, as in encoding scheme 502F. Similarly, suffix 508A-F may vary in reverse proportion from 56 bits, as in encoding scheme 502A, to 0 bits, as in encoding scheme 502F. The IPv4 address may be stored in payload portions 506A-F and may follow immediately after the prefix portion, as shown in encoding schemes 502A-C and 502F. Alternatively, the IPv4 address may be stored at the end of the payload portion near the suffix portion, as shown in encoding schemes 502D-E. In certain embodiments, encoding schemes 502A and 502B may be preferred since a prefix portion 504A or 504B of 32 bits or 40 bits leaves available other bits in the data packet to encode other proposed parameters. Doing so allows the NAT state to be logged for countries that require it (for police or other authorities to look into).

In various embodiments, gateway support node 202 may be configured to store call detail records (CDRs) CDRs. Accordingly, it may be very cost efficient to also store the network address translation (NAT) states in the CDRs. For example, in a particular embodiment, any down-link packet that is on its way to wireless devices 212A-C from provider edge device 224 may carry the IPv4 address and source port used on the other side of provider edge device 224. This implies that only down-link packets may update the NAT-state in the CDRs. However, up-link packets may also update the NAT-state in the CDRs, where provider edge device 224 is triggered to create a "dummy" packet in the down-link. This may for instance be done by adding a bit in the up-link packets suffix that implies that a dummy down-link packet should be generated.

In certain embodiments, the suffix in the up-link can also be used for high-availability functions in the NAT. As the NAT-state is sent to gateway support node 202, the NAT-state can be stored locally at gateway support node 202 and may also be sent in all up-link packets. As such, a redundant provider edge device 224 need not know the actual NAT state for ongoing flow since the NAT state can be re-created from the information in the packets. Additionally, gateway support node 202 may not need to have the state be resilient since it is available in provider edge device 224. The state resilient may be recreated after a failover (for instance a board restart) from the information in the packet.

The described techniques may enable a completely stateless front-end in provider edge device 224 since the only state that needs to be handled is allocation of an IPv4 address and source port combination and update that allocation before the Allocation of the IPv4 address and source port may be done towards a centralized database in the network. In that case the registration of the IPv4 address and source port may be done towards the terminals IPv6 prefix (which is available in the up-link packets).

Figure 6:
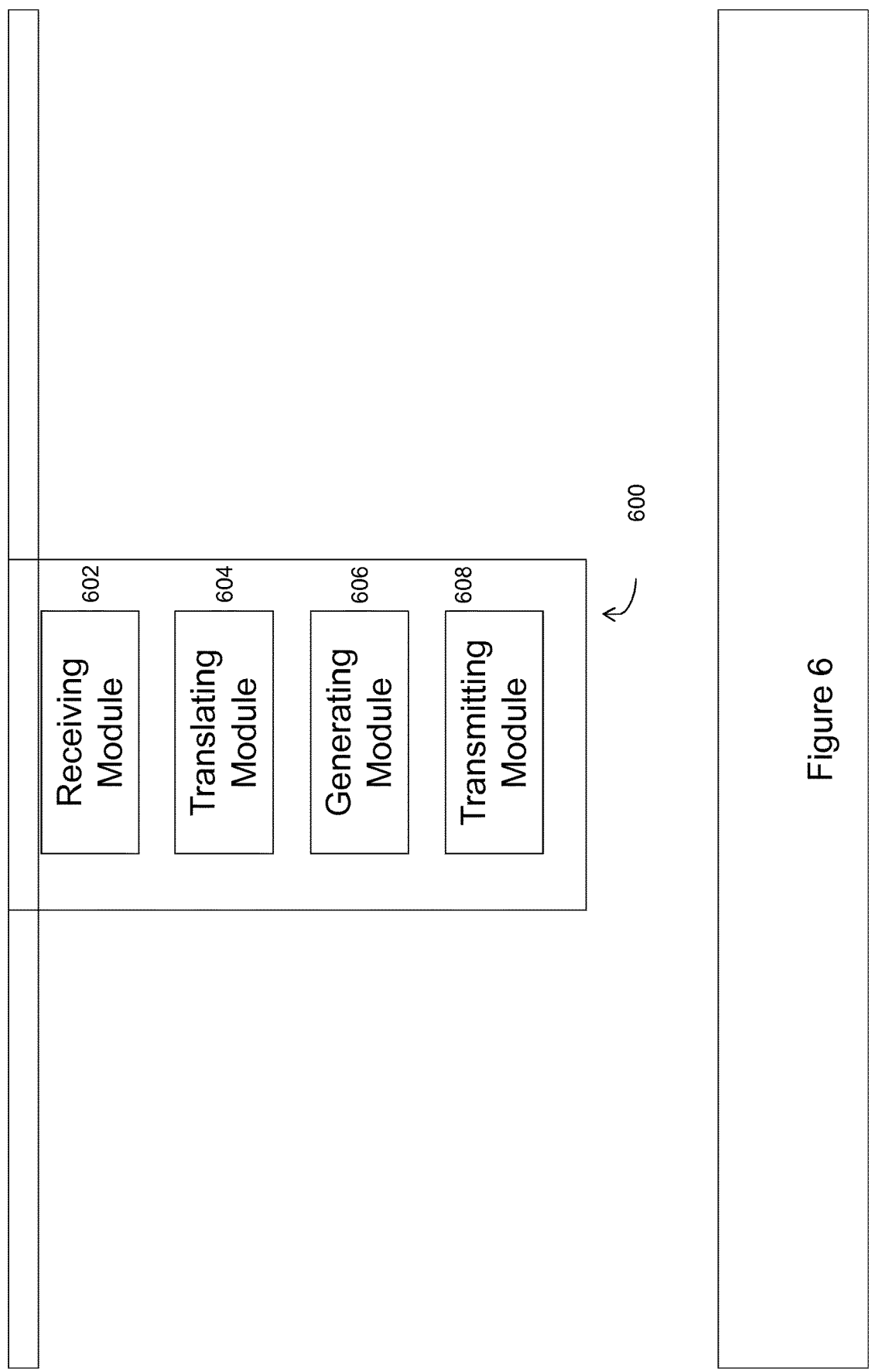
FIG. 6 is a block diagram illustrating an exemplary network node, according to a particular embodiment.

In certain embodiments, gateway support node 202 may operate as a computer networking virtual apparatus. FIG. 6 is a block diagram illustrating a computer networking virtual apparatus 600. As depicted, the virtual apparatus 600 includes at least one receiving module 602, a translating module 604, a generating module 606, and a transmitting module 608. The receiving module 602 may perform the receiving functions of gateway support node 202, as described herein. For example, receiving module may receive a data packet from a wireless device. The data packet may include a target IP address associated with a destination device.

Translating module 604 may perform the translating functions of virtual apparatus 600, as described herein. For example, translating module 604 may translate the target IP address into a synthetic IP address.

Generating module 606 may generate a modified data packet by replacing the target IP address in the data packet with the synthetic IP address. The synthetic IP address may contain the target IP address, in some embodiments. For example, in a particular embodiment, the target IP address may be an IPv4 address and the synthetic address may include an IPv6 address. In a particular embodiment, the IPv6 address may include an IPv6 prefix and the target IP address. In a particular embodiment, the IPv6 prefix may be either 32 or 40 bits and the IPv4 address may be 24 bits.

Transmitting module 608 may perform the transmission functions of virtual apparatus 600. For example, transmitting module 608 may transmit the modified data packet to the destination address. The modified data packet may be transmitted over an IPv6 network 201. In a particular embodiment, the destination address may be that of a provider edge device 224, which may perform PLAT operations for the delivery of the data packet to the device hosting the requested service.

Figure 7:
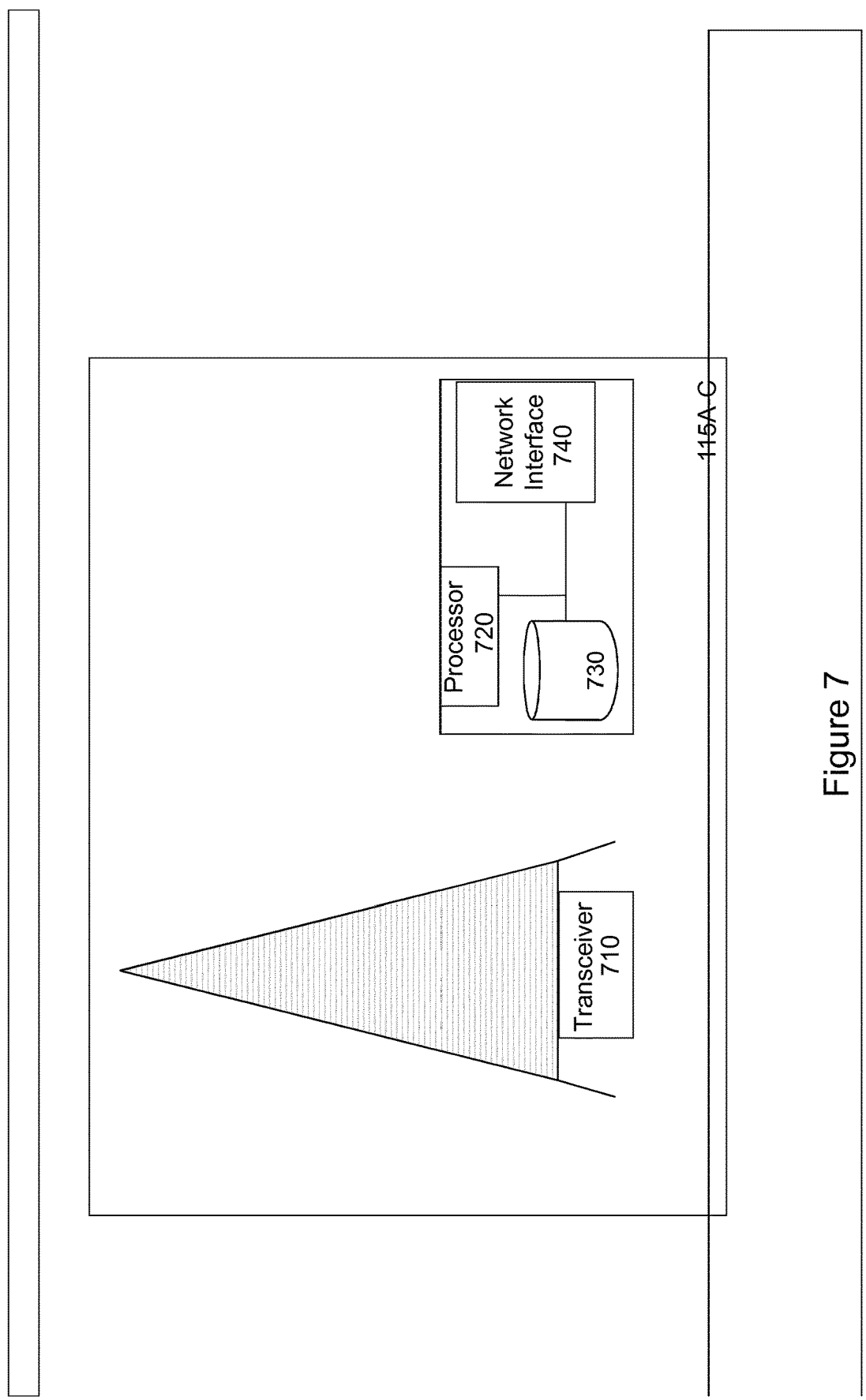
FIG. 7 is a block diagram illustrating an exemplary controller node, according to a particular embodiment.

FIG. 7 is a block diagram illustrating embodiments of network node 115A-C. In certain embodiments, network node 115A-C includes a radio access node, such as an eNodeB, a node B, a base station, a wireless access point (e.g., a Wi-Fi access point), a low power node, a base transceiver station (BTS), transmission points, transmission nodes, remote RF unit (RRU), remote radio head (RRH), a relay node, a UE acting as a relay node, or another suitable radio access node.

Network nodes 115A-C are deployed throughout network 100 as a homogenous deployment, heterogeneous deployment, or mixed deployment. A homogenous deployment generally describes a deployment made up of the same (or similar) type of radio access nodes and/or similar coverage and cell sizes and inter-site distances. A heterogeneous deployment generally describes deployments using a variety of types of radio access nodes having different cell sizes, transmit powers, capacities, and inter-site distances. For example, a heterogeneous deployment may include a plurality of low-power nodes placed throughout a macro-cell layout. Mixed deployments include a mix of homogenous portions and heterogeneous portions.

As depicted, network nodes 115A-C includes one or more of transceiver 710, processor 720, memory 730, and network interface 740. Transceiver 710 facilitates transmitting wireless signals to and receiving wireless signals from wireless communication device 110A-C; 212A-C (e.g., via an antenna), processor 720 executes instructions to provide some or all of the functionality described above as being provided by a network node 115A-C, memory 730 stores the instructions executed by processor 720, and network interface 740 communicates signals to backend network components, such as a gateway, switch, router, Internet, Public Switched Telephone Network (PSTN), other network nodes, core network nodes 130, etc.

Processor 720 includes any suitable combination of hardware and software implemented in one or more modules to execute instructions and manipulate data to perform some or all of the described functions of network node 115A-C. In some embodiments, processor 720 includes, for example, one or more computers, one or more central processing units (CPUs), one or more microprocessors, one or more applications, and/or other logic.

Memory 730 is generally operable to store instructions, such as a computer program, software, an application including one or more of logic, rules, algorithms, code, tables, etc. and/or other instructions capable of being executed by a processor. Examples of memory 730 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 740 is communicatively coupled to processor 720 and refers to any suitable device operable to receive input for radio network node 115A-C, send output from radio network node 115A-C, perform suitable processing of the input or output or both, communicate to other devices, or any combination of the preceding. Network interface 740 includes appropriate hardware (e.g., port, modem, network interface card, etc.) and software, including protocol conversion and data processing capabilities, to communicate through a network.

Other embodiments of network node 115A-C include additional components (beyond those shown in FIG. 7) responsible for providing certain aspects of the radio network node's functionality, including any of the functionality described above and/or any additional functionality (including any functionality necessary to support the solution described above). The various different types of radio access nodes may include components having the same physical hardware but configured (e.g., via programming) to support different radio access technologies, or may represent partly or entirely different physical components.

Figure 8:
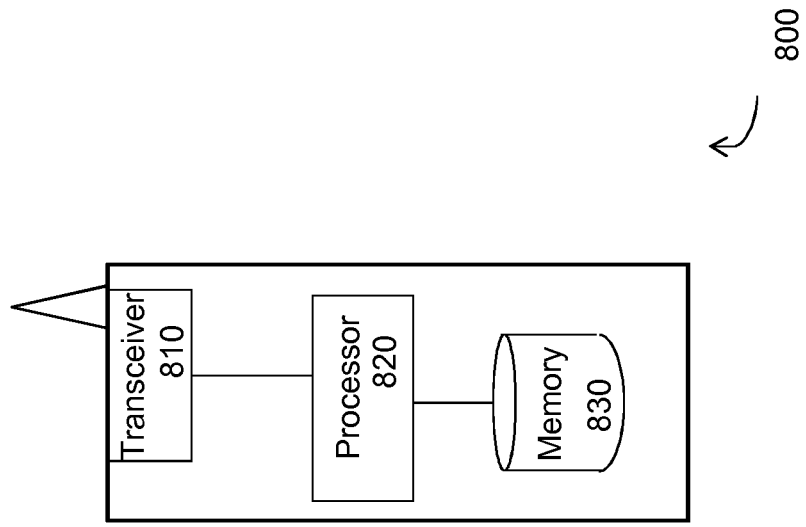
FIG. 8 is a block diagram illustrating an exemplary wireless device, according to a particular embodiment.

FIG. 8 is a block diagram illustrating certain embodiments of a wireless device 800. In certain embodiments, wireless device 800 may include an IPv4 wireless device such as wireless devices 212A. In certain embodiments, wireless device 800 may include an IPv4v6 wireless device such as wireless device 212B. Additionally, wireless device 800 may include an IPv6 wireless device such as wireless device 212C. Example wireless device 800 includes a mobile phone, a smart phone, a PDA (Personal Digital Assistant), a portable computer (e.g., laptop, tablet), a personal computer, a sensor, a modem, a machine type (MTC) device/machine to machine (M2M) device, laptop embedded equipment (LEE), laptop mounted equipment (LME), USB dongles, a device-to-device capable device, or another device that can provide wireless communication. A wireless device 800 may also be referred to as user equipment (UE), a station (STA), a device, or a terminal in some embodiments.

In the depicted embodiment, wireless device 800 includes transceiver 810, processor 820, and memory 830. In some embodiments, transceiver 810 facilitates transmitting signals to and receiving signals from gateway support node 202 or other network devices such as network nodes 115A-C.

Processor 820 executes instructions to provide some or all of the functionality described above as being provided by wireless devices 110A-C and 212A-C, and memory 830 stores the instructions executed by processor 820.

Processor 820 may include any suitable combination of hardware and software implemented in one or more modules to execute instructions and manipulate data to perform some or all of the described functions of wireless devices 110A-C and 212A-C. In some embodiments, processor 820 may include, for example, one or more computers, one or more central processing units (CPUs), one or more microprocessors, one or more applications, and/or other logic.

Memory 830 is generally operable to store instructions, such as a computer program, software, an application including one or more of logic, rules, algorithms, code, tables, etc. and/or other instructions capable of being executed by a processor. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 800 may include additional components beyond those shown in FIG. 8 that may be responsible for providing certain aspects of the wireless device's functionality, including any of the functionality described above and/or any additional functionality (including any functionality necessary to support the solution described above).

Figure 9:
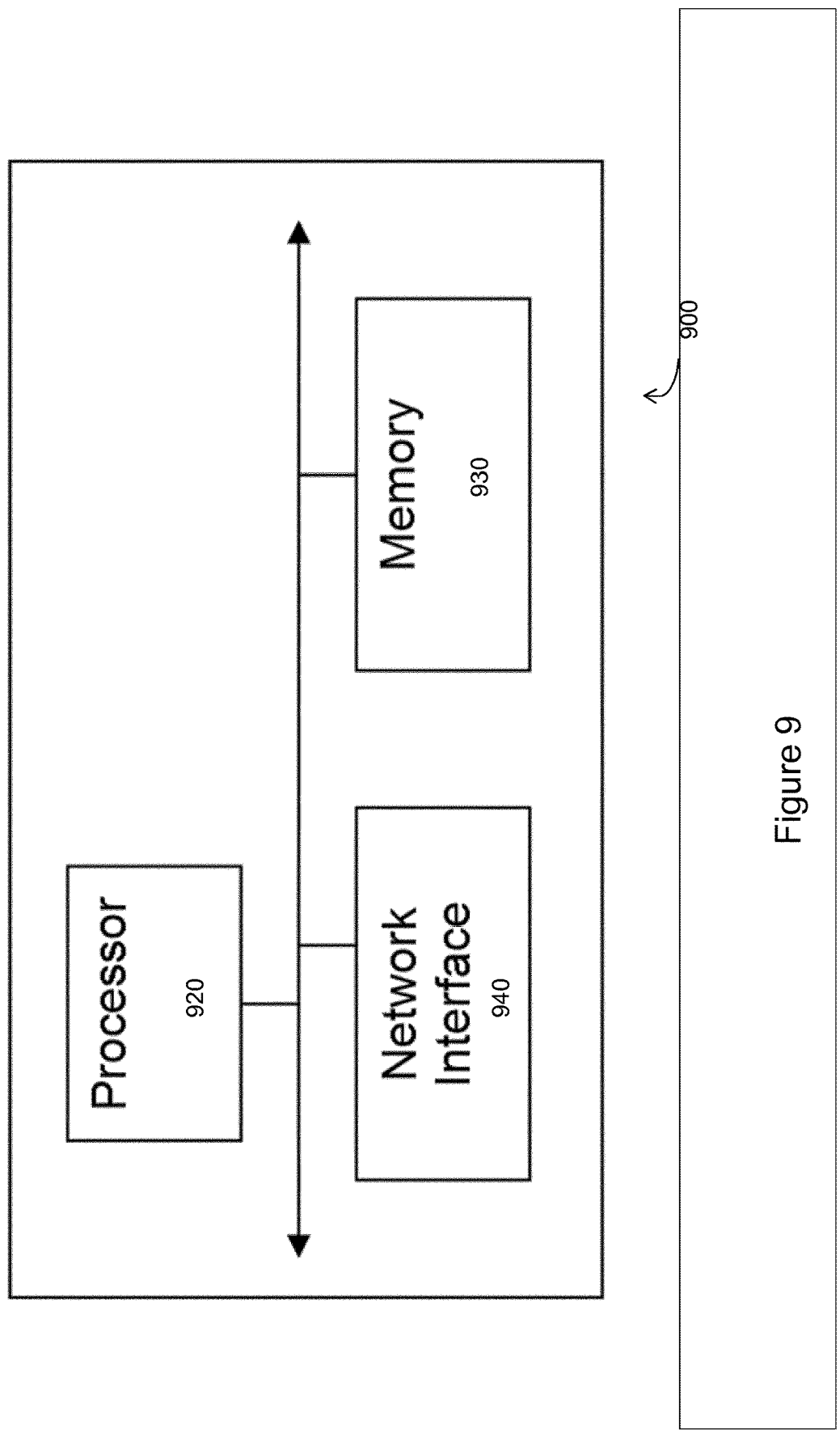

FIG. 9 is a block diagram illustrating a core network node 130. Examples of core network node 130 can include a mobile switching center (MSC), a serving GPRS support node (SGSN), a mobility management entity (MME), a radio network controller (RNC), a base station controller (BSC), and so on. Core network node 130 includes processor 920, memory 930, and network interface 940. In some embodiments, processor 920 executes instructions to provide some or all of the functionality described above as being provided by core network node 130, memory 930 stores the instructions executed by processor 920, and network interface 940 communicates signals to an suitable node, such as a gateway, switch, router, Internet, Public Switched Telephone Network (PSTN), radio network nodes 115, other core network nodes 130, etc.

Processor 920 includes any suitable combination of hardware and software implemented in one or more modules to execute instructions and manipulate data to perform some or all of the described functions of core network node 130. In some embodiments, processor 920 includes, for example, one or more computers, one or more central processing units (CPUs), one or more microprocessors, one or more applications, and/or other logic.

Memory 930 is generally operable to store instructions, such as a computer program, software, an application including one or more of logic, rules, algorithms, code, tables, etc. and/or other instructions capable of being executed by a processor. Examples of memory 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 940 is communicatively coupled to processor 920 and may refer to any suitable device operable to receive input for core network node 900, send output from core network node 900, perform suitable processing of the input or output or both, communicate to other devices, or any combination of the preceding. Network interface 940 includes appropriate hardware (e.g., port, modem, network interface card, etc.) and software, including protocol conversion and data processing capabilities, to communicate through a network.

Other embodiments of core network node 900 include additional components (beyond those shown in FIG. 13) responsible for providing certain aspects of the core network node's functionality, including any of the functionality described above and/or any additional functionality (including any functionality necessary to support the solution described above).

Some embodiments of the disclosure may provide one or more technical advantages. For example, certain embodiments may place the CLAT-part of the 464XLAT technology in the gateway support node instead of the wireless device. As a result, wireless devices that do not include support for the 464XLAT technology may get support for 464XLAT processing through the use of a CLAT service in the GGSN/PGW or other gateway support node 202. As a result, the entire Gi/SGi network can become IPv6 only for applications that have this functionality activated. Still another technical advantage may be that the operator is not required to in any way manage IPv4 addresses.

Another technical advantage may be that the amount of IPv4 traffic of a dual stack implementation flowing through the NAT44/NAT64 is not more than with a pure non-NATed IPv4 setup. However, if Dual Stack is deployed, IPv6 may increasingly offload IPv4 as more services are also offered over IPv6. Furthermore, as NAT capacity needs decreases, the need for NAT expansion will be reduced and may be eliminated.

Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A method for providing Internet Protocol (IP) address translation services, the method comprising:
    receiving, at a network node, an IP version 4 (IPv4) packet comprising a destination address field storing a target IPv4 address associated with a destination device;
    translating, by the network node, the target IPv4 address into a destination IP version 6 (IPv6) address;
    generating, by the network node, an IPv6 packet comprising a source address field and a destination address field, wherein the destination address field of the IPv6 packet contains the destination IPv6 address; and
    the network node transmitting the IPv6 packet over an IPv6 network towards the destination device, wherein the destination IPv6 address comprises:
        a prefix portion, the target IPv4 address immediately following the prefix portion, a null octet immediately following the target IPv4 address, and a suffix portion following the null octet; or
        a prefix portion, a null octet following the prefix portion, the target IPv4 address immediately following the null octet, and a suffix portion immediately following the target IPv4 address, and
    the suffix portion of the destination IPv6 address comprises a source IPv4 address such that the destination IPv6 address comprises both the target IPv4 address and the source IPv4 address.

2. The method of claim 1, wherein
    the suffix portion of the destination IPv6 address further comprises a port number.

3. The method of claim 1, wherein the prefix portion of the destination IPv6 address contains an IPv6 prefix.

4. The method of claim 3, wherein the IPv6 prefix is either 32 bits or 40 bits.

5. The method of claim 1, wherein the network node comprises a gateway node (PGW).

6. The method of claim 1, wherein the IP version 4 packet was transmitted by a dual stack IPv4v6 wireless device or an IPv4 wireless device.

7. The method of claim 1, further comprising storing a network address translation state at the network node.

8. The method of claim 1, wherein the network node maintains a repository storing a plurality of unique IPv4 addresses.

9. The method of claim 8, further comprising:
    receiving a create session request from a wireless device;
    assigning a particular one of the plurality of unique IPv4 addresses to the wireless device; and
    transmitting the particular one of the plurality of unique IPv4 addresses to the wireless device.

10. The method of claim 1, further comprising:
    receiving a create session request from a wireless device;
    assigning a non-unique IPv4 address to the wireless device; and
    transmitting the non-unique IPv4 address to the wireless device.

11. A network node for providing Internet Protocol (IP) address translation services, the network node comprising:
    a memory storing instructions; and
    one or more processors in communication with the memory, the one or more processors operable to:
        obtain a target IP version 4 (IPv4) address from an IPv4 packet received at the network node, wherein the target IPv4 address is associated with a destination device;
        translate the target IPv4 address into a destination IP version 6 (IPv6) address;

generate an IPv6 packet comprising a source address field and a destination address field, wherein the destination address field of the IPv6 packet contains the destination IPv6 address;

transmit the IPv6 packet over an IPv6 network towards the destination device associated with the target IPv4 address, wherein the destination IPv6 address comprises:
- a prefix portion, the target IPv4 address immediately following the prefix portion, a null octet immediately following the target IPv4 address, and a suffix portion following the null octet; or
- a prefix portion, a null octet following the prefix portion, the target IPv4 address immediately following the null octet, and a suffix portion immediately following the target IPv4 address, and the suffix portion of the destination IPv6 address comprises a source IPv4 address such that the destination IPv6 address comprises both the target IPv4 address and the source IPv4 address.

12. The network node of claim 11, wherein, the suffix portion of the destination IPv6 address further comprises a port number.

13. The network node of claim 12, wherein the prefix portion of the destination IPv6 address contains an IPv6 prefix.

14. The network node of claim 13, wherein the IPv6 prefix is either 32 bits or 40 bits.

15. The network node of claim 11, wherein the network node comprises a gateway node (PGW).

16. The network node of claim 11, wherein the IP version 4 packet was transmitted by a dual stack IPv4v6 wireless device or an IPv4 wireless device.

17. The network node claim 11, wherein a network address translation state is stored at the network node.

18. The network node of claim 11, wherein the one or more processors is further operable to maintain a repository storing a plurality of unique IPv4 addresses.

19. The network node of claim 18, wherein the one or more processors are further operable to:
assign a particular one of the plurality of unique IPv4 addresses to a wireless device in response to the network node receiving a create session request from the wireless device; and
transmit the particular one of the plurality of unique IPv4 addresses to the wireless device.

20. The network node of claim 11, wherein the one or more processors are further operable to:
assign a non-unique IPv4 address to a wireless device in response to the network node receiving a create session request from the wireless device; and
transmit the non-unique IPv4 address to the wireless device.

* * * * *